R. E. GRIEWE AND R. JOHNSON.
BUMPER.
APPLICATION FILED MAY 24, 1921.
1,394,170. Patented Oct. 18, 1921.
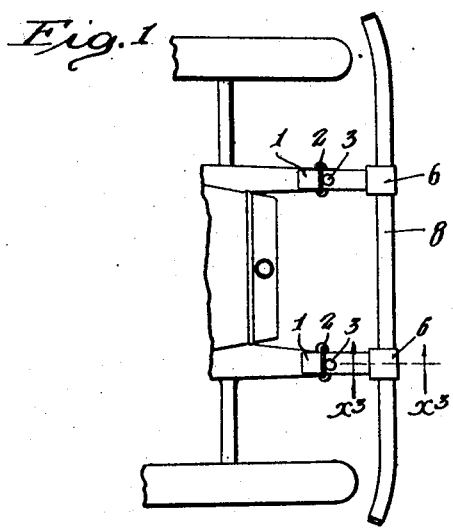
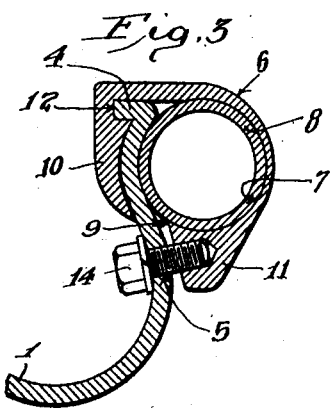
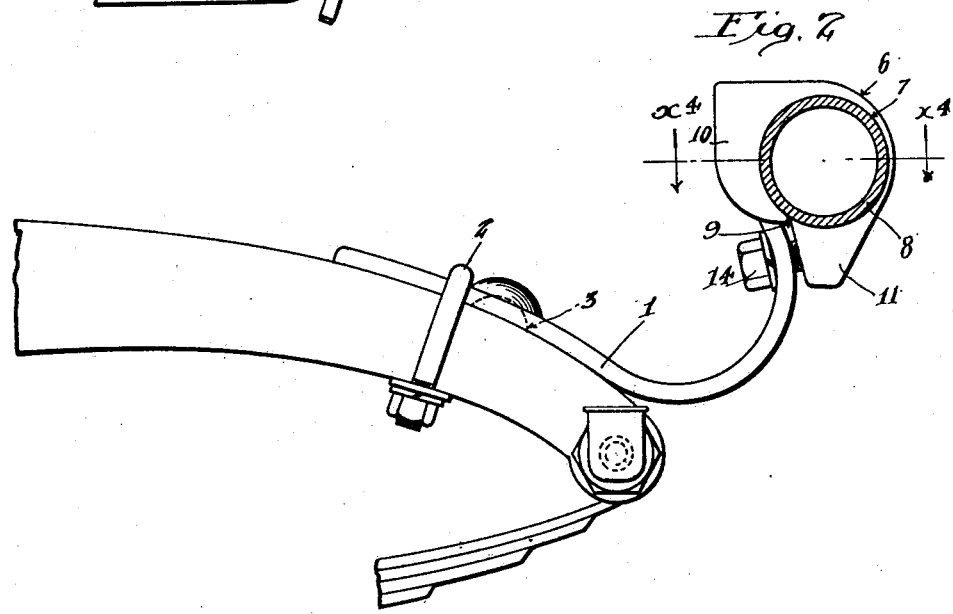
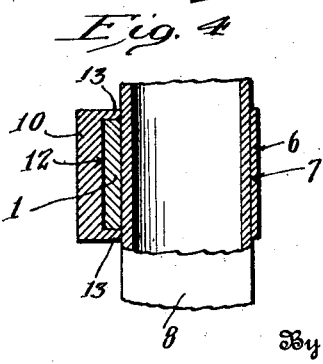
Inventor
Rafael E Griewe
Raymond Johnson
By Frederick W. Ryan
Attorney

UNITED STATES PATENT OFFICE.

RAFAEL E. GRIEWE AND RAYMOND JOHNSON, OF LOS ANGELES, CALIFORNIA.

BUMPER.

1,394,170.  Specification of Letters Patent.  Patented Oct. 18, 1921.

Application filed May 24, 1921. Serial No. 472,228.

*To all whom it may concern:*

Be it known that we, RAFAEL E. GRIEWE and RAYMOND JOHNSON, citizens of the United States, residing at Los Angeles, in the county of Los Angeles and State of California, have invented a new and useful Bumper, of which the following is a specification.

This invention relates to improvements in bumpers, especially adapted for automobiles, and its object is to provide a bumper which may be quickly and readily attached to or detached from the automobile frame.

Another object is to provide a bumper with the supporting means comprising a supporting member and a head hingedly connected thereto with the two members drawn together to rigidly clamp the bumper bar between them.

A further object is to provide a bumper with a supporting means comprising two members contoured to hingedly interlock together for relative movement whereby upon drawing the members together the bumper bar will be clamped between said members.

Various other objects and advantages of the invention will be more fully apparent from the following description and the accompanying drawings, which form a part of this disclosure and which illustrate a preferred form of embodiment of the invention.

Of the drawings:

Figure 1 is a plan view of the front portion of an automobile with our improved bumper attached thereto.

Fig. 2 is an enlarged elevation of the bumper and the forward end of the automobile frame, the bumper bar being shown in section.

Fig 3 is an enlarged section on line $x^3$—$x^3$ of Fig. 1.

Fig. 4 is a section on line $x^4$—$x^4$, Fig. 2.

The bumper consists of a pair of supporting devices attached to the opposite frame beams of the automobile, and a tubular bumper bar having its ends slightly bent rearwardly as is the usual practice with this type of bumper.

As the supporting devices are of duplicate structure a detailed description of one thereof will herein be sufficient. Each of such devices as a means for supporting the bumper bar, comprises a flat spring supporting member 1 having its rear end curved to conform to the shape of the frame beam of the machine and is attached thereto by a shackle bolt 2 of any standard or specific construction, it being evident that various forms of bolts or other clamping devices may be used as such do not have particular bearing upon the present invention. The supporting member may have, if desired, an indent 3 to engage over a rivet head on the frame beam of the machine if such rivet head is present.

The supporting member 1 extends forwardly and upwardly to an approximately vertical plane, and its free end is provided with a hooked nose 4 and an adjacent portion curved to fit the bumper bar, and spaced from said curved portion is an aperture 5 to accommodate a clamp bolt. A head 6 is provided with a transverse opening 7 to receive the bumper bar 8, said head being split at 9 to provide opposed ends 10, 11. The inner peripheral wall of the end 10 is provided with a pocket 12 and the adjacent wall surface is grooved to form side flanges 13. The free end of the supporting member 1 is positioned in the groove between the flanges 13 with the hooked nose 4 engaging in the pocket 12, and a clamp bolt 14 engages through the aperture 5 and is screw-threaded into the end 11 of the head 6.

A tightening of the clamp bolt 14 will draw the two members together to grip the bumper bar between them, the head 6 in this instance functioning as a lever of the second class in which the hooked end of the supporting member 1 constitutes the fulcrum, the end 11 constitutes the power end of the lever, and the intermediate portion constitutes the resistance portion of the lever. This construction provides a two-part hingedly united supporting means in which each of the members engages the surface of the bumper bar and by a tightening of the bolt 14 are positively drawn together to frictionally grip the bar.

We claim:

1. In a bumper for vehicles, a bumper bar, and means adapted for attachment to the vehicle to support the bar, said means comprising a head having a transverse opening to receive the bar, a supporting member providing a fulcrum engaging the head beyond the bar, and means functioning to clamp the bar between the head and the supporting member with the head functioning as a lever of the second class.

2. In a bumper for vehicles, a bumper bar, and means adapted for attachment to the vehicle to support the bar, said means comprising a head having a transverse opening to receive the bar, a supporting member having a hooked free end providing a fulcrum seated in the head beyond the bar, the adjacent portion of said member engaging the bar, and means functioning to rock the head on said member to clamp the bar thereto.

3. In a bumper for vehicles, a bumper bar, and means adapted for attachment to the vehicle to support the bar, said means comprising a head having a transverse opening to receive the bar, a pocket beyond the bar and an adjacent recess extending through the wall of the head, a supporting member engaging within the recess and having a hooked free end engaging into the pocket, and means functioning to clamp the bar between the head and the supporting member.

4. In a bumper for vehicles, a bumper bar, and means adapted for attachment to the vehicle to support the bar, said means comprising a split head having a transverse opening to receive the bar, one end of the head having a pocket formed in its inner wall beyond the bar, a supporting member having a hooked free end engaging into said pocket and contacting with the bar, and means engaging the opposite end of the head and the supporting member to draw them together to clamp the bar.

5. In a bumper for vehicles, a bumper bar, and means adapted for attachment to the vehicle to support the bar, said means comprising a split head having a transverse opening to receive the bar, one end of the head having a groove in its inner wall terminating with a pocket beyond the bar, a supporting member extending within the groove and having a hooked end engaging into the pocket, and means engaging the opposite end of the head and the supporting member to draw them together to clamp the bar.

6. In a bumper for vehicles, a bumper bar, and means adapted for attachment to the vehicle to support the bar, said means comprising a supporting member contacting one side of the bar, a head hingedly engaging the free end of said member and contacting the opposite side of the bar, and means functioning to draw the two members together to grip the bar between them.

7. In a bumper for vehicles, a bumper bar, and means adapted for attachment to the vehicle to support the bar, said means comprising a flat spring supporting member having a hooked end, an adjacent portion curved to fit the bar and an aperture spaced from said curved portion, a head having a transverse opening to receive the bar, a pocket formed in its inner peripheral surface to receive the hooked end of said member and the wall adjacent the pocket being grooved to provide side flanges engaging the side edges of said member, and a bolt extending through the aperture in the supporting member and screw-threaded into the head and functioning to draw the head and member together to clamp the bar between them.

Signed at Los Angeles, California, this 18th day of May, 1921.

RAFAEL E. GRIEWE.
RAYMOND JOHNSON.

Witnesses:
CLARENCE B. FOSTER,
HARVEY S. JOHNSON.